US012285967B2

(12) United States Patent
Nakadai

(10) Patent No.: US 12,285,967 B2
(45) Date of Patent: Apr. 29, 2025

(54) WRITING INSTRUMENT AND PEN TIP PART

(71) Applicant: THE SAILOR PEN CO., LTD., Hiroshima (JP)

(72) Inventor: Yuichiro Nakadai, Hiroshima (JP)

(73) Assignee: THE SAILOR PEN CO., LTD., Hiroshima (JP)

( * ) Notice: Subject to any disclaimer, the term of this patent is extended or adjusted under 35 U.S.C. 154(b) by 0 days.

(21) Appl. No.: 18/602,723

(22) Filed: Mar. 12, 2024

(65) Prior Publication Data

US 2024/0217261 A1 Jul. 4, 2024

Related U.S. Application Data

(63) Continuation of application No. PCT/JP2022/033401, filed on Sep. 6, 2022.

(30) Foreign Application Priority Data

Sep. 14, 2021 (JP) ................................ 2021-149613

(51) Int. Cl.
*B43K 5/00* (2006.01)
*B43K 23/008* (2006.01)
*B43K 23/012* (2006.01)

(52) U.S. Cl.
CPC ............ *B43K 5/005* (2013.01); *B43K 23/008* (2013.01); *B43K 23/012* (2013.01)

(58) Field of Classification Search
CPC .......... B43K 5/005; B43K 5/16; B43K 23/00; B43K 23/004; B43K 23/008; B43K 23/012; B43K 23/016
USPC ................ 401/221, 236, 249, 250, 251, 257
See application file for complete search history.

(56) References Cited

U.S. PATENT DOCUMENTS 2,996,044 A * 8/1961 Parker .................... B43K 5/005 401/222
RE38,440 E * 2/2004 Dowst ...................... B43K 7/00 401/214

FOREIGN PATENT DOCUMENTS

CN 101177091 A * 5/2008 ............ B43K 23/00
JP 38-518 Y1 1/1963
JP 48-7880 Y1 3/1973
JP 56-167499 A 12/1981
JP 2007-331364 A 12/2007
JP 2009-178852 A 8/2009
JP 4972934 B2 7/2012
JP 2012-166381 A 9/2012
(Continued)

OTHER PUBLICATIONS

International Preliminary Report on Patentability, including English translation of the Written Opinion of the International Searching Authority, issued Mar. 5, 2024, in connection with PCT International Application No. PCT/JP2022/033401.
(Continued)

*Primary Examiner* — David J Walczak
(74) *Attorney, Agent, or Firm* — John P. White

(57) ABSTRACT

A writing instrument and a pen tip part include: a pen tip which includes a writing portion and has a directional specification for writing of the writing portion; a cylindrical inner cylinder which fixes the pen tip; a cylindrical outer cylinder into which the inner cylinder can be inserted and which includes a finger guide portion on an outer peripheral surface; and a fixture which fixes the outer cylinder to the inner cylinder.

4 Claims, 9 Drawing Sheets

(56) References Cited

FOREIGN PATENT DOCUMENTS

| | | | |
|---|---|---|---|
| JP | 2018-30287 | A | 3/2018 |
| TW | 200410840 | A | 7/2004 |
| TW | M365266 | U | 9/2009 |

OTHER PUBLICATIONS

Office Action issued Mar. 9, 2023, including English language translation, in connection with Taiwanese Patent Application No. TW 11220231240.

International Search Report, Nov. 1, 2022, including English language translation, for PCT/JP2022/033401.

* cited by examiner

WRITING INSTRUMENT AND PEN TIP PART

CROSS-REFERENCE TO RELATED APPLICATION

This application is a Continuation application of PCT Application No. PCT/JP2022/033401, filed Sep. 6, 2022 and based upon and claiming the benefit of priority from Japanese Patent Application No. 2021-149613, filed Sep. 14, 2021, the entire contents of all of which are incorporated herein by reference.

FIELD

The present invention relates to a writing instrument for writing with a pen tip, and a pen tip part for a writing instrument.

BACKGROUND

A writing instrument which utilizes a pen tip for writing on the surface of a paper sheet, etc. is known. Such a writing instrument is held by fingers of a user. For writing instruments, therefore, shapes and materials of their grip portions have been devised in various ways, and writing instruments with improved easy-to-grip properties, non-slip properties, fatigue reducing properties, and so on are known. For example, Jpn. Pat. Appln. KOKAI Publication No. 2009-178852 discloses a ballpoint pen of such a kind.

As a shape of the grip portion of a ballpoint pen, i.e., a writing instrument, various shapes are available, including, for example, a columnar shape, a truncated conical shape, a shape that looks as if one or more portions of a columnar shape or a truncated conical shape have been cut off, a shape with a partial recess or projection over the entire circumference, etc. Also, for resin materials which constitute the grip portion, various hardness degrees are set, where hard to soft materials or the like are applicable, and even air or gel-embedded materials have been known. Writing instruments employing a metal material as a material of the grip portion are also known.

Japanese Patent No. 4972934 discloses a fountain pen, i.e., a writing instrument, and a technique for allowing a unit of a writing portion to be rotatably arranged on the body of the fountain pen while making a rotation resistance variable and settable using an increase or a decrease of an attached elastic element, so that positioning between an emblem or a pattern on the body and the pen tip is performed.

Also, Jpn. Pat. Appln. KOKAI Publication No. 2007-331364 discloses a bamboo pen in which a bamboo-made pen tip body is inserted into a pen shaft.

SUMMARY

According to an aspect of the invention, a writing instrument includes: a pen tip which includes a writing portion and has a directional specification for writing of the writing portion; a cylindrical inner cylinder which fixes the pen tip; a cylindrical outer cylinder into which the inner cylinder can be inserted and which includes a finger guide portion on an outer peripheral surface; a fixture which fixes the outer cylinder to the inner cylinder; and a barrel which is fixed to the inner cylinder.

According to an aspect of the invention, a pen tip part includes: a pen tip which includes a writing portion and has a directional specification for writing of the writing portion;

a cylindrical inner cylinder which fixes the pen tip; a cylindrical outer cylinder into which the inner cylinder can be inserted and which includes a finger guide portion on an outer peripheral surface; and a fixture which fixes the outer cylinder to the inner cylinder.

DETAILED DESCRIPTION

A description will be given of a writing instrument 1 and a pen tip part 2 used in the writing instrument 1 according to an embodiment of the present invention, with reference to FIGS. 1 to 7.

Figure 1:
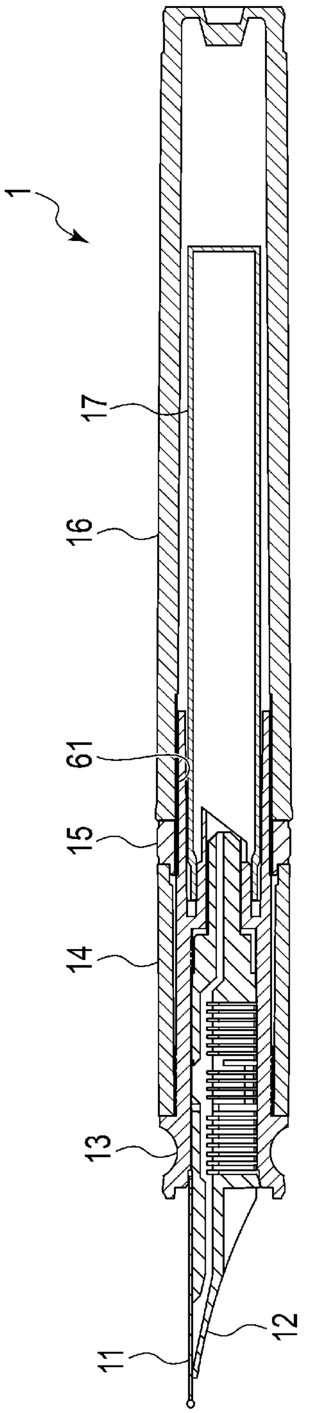
FIG. 1 is a sectional view showing a structure of a writing instrument according to an embodiment of the present invention.
Figure 2:
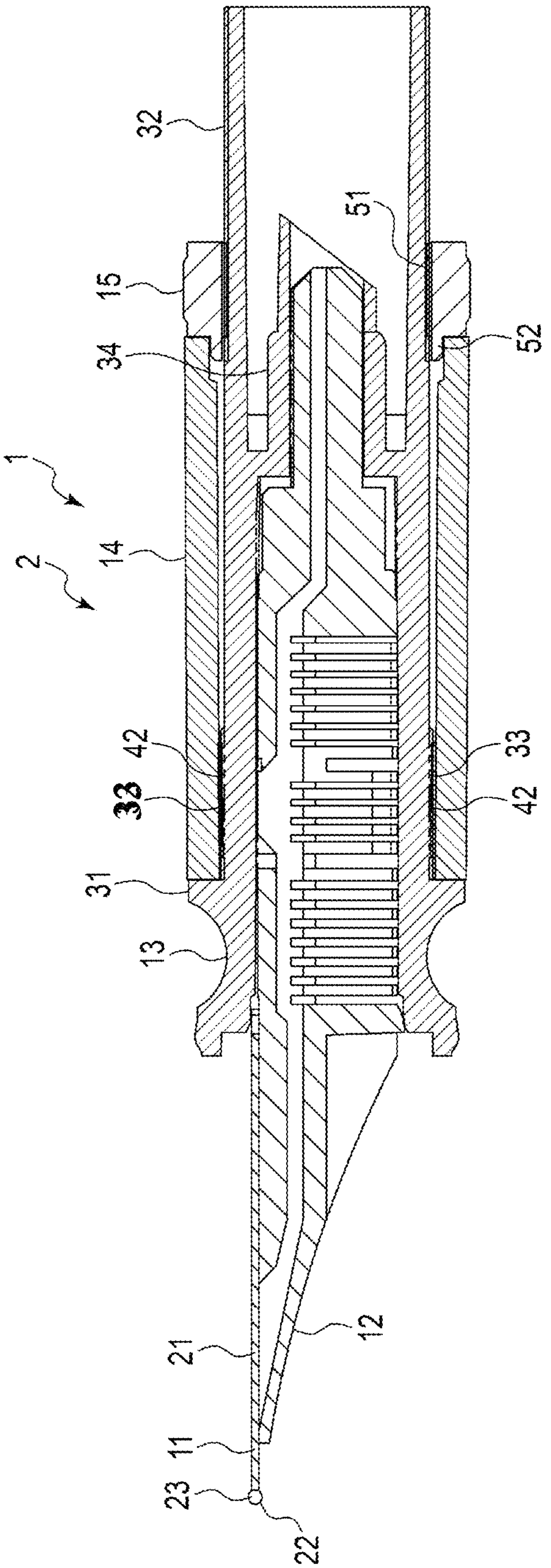
FIG. 2 is a sectional view showing a structure of a pen tip part of the writing instrument.
Figure 3:
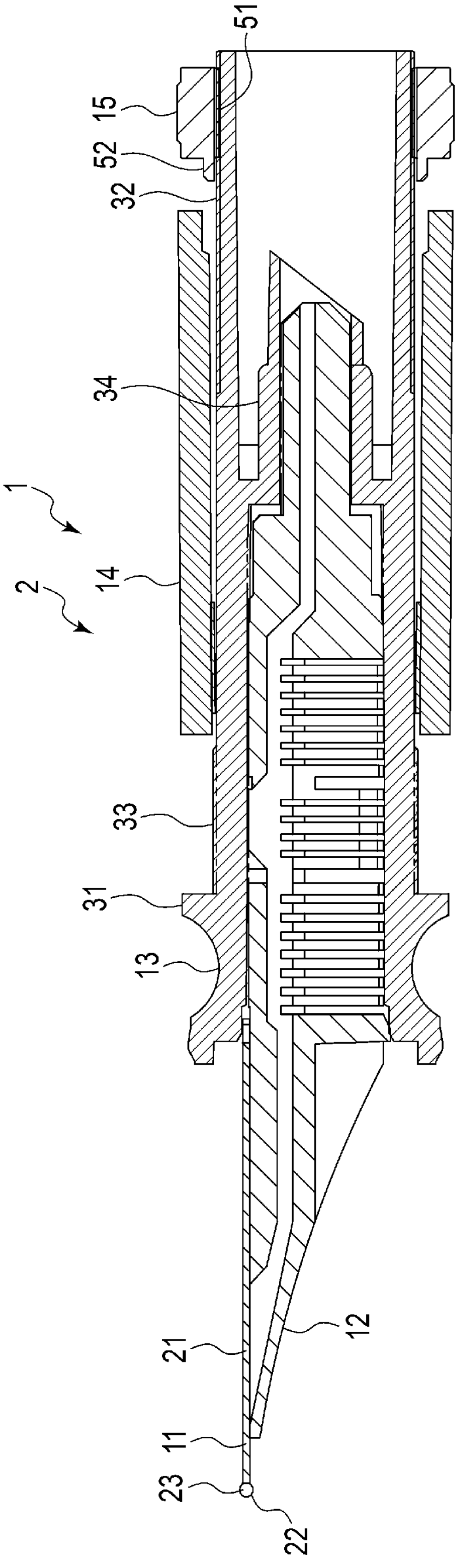
FIG. 3 is a sectional view showing a structure of the pen tip part.
Figure 4:
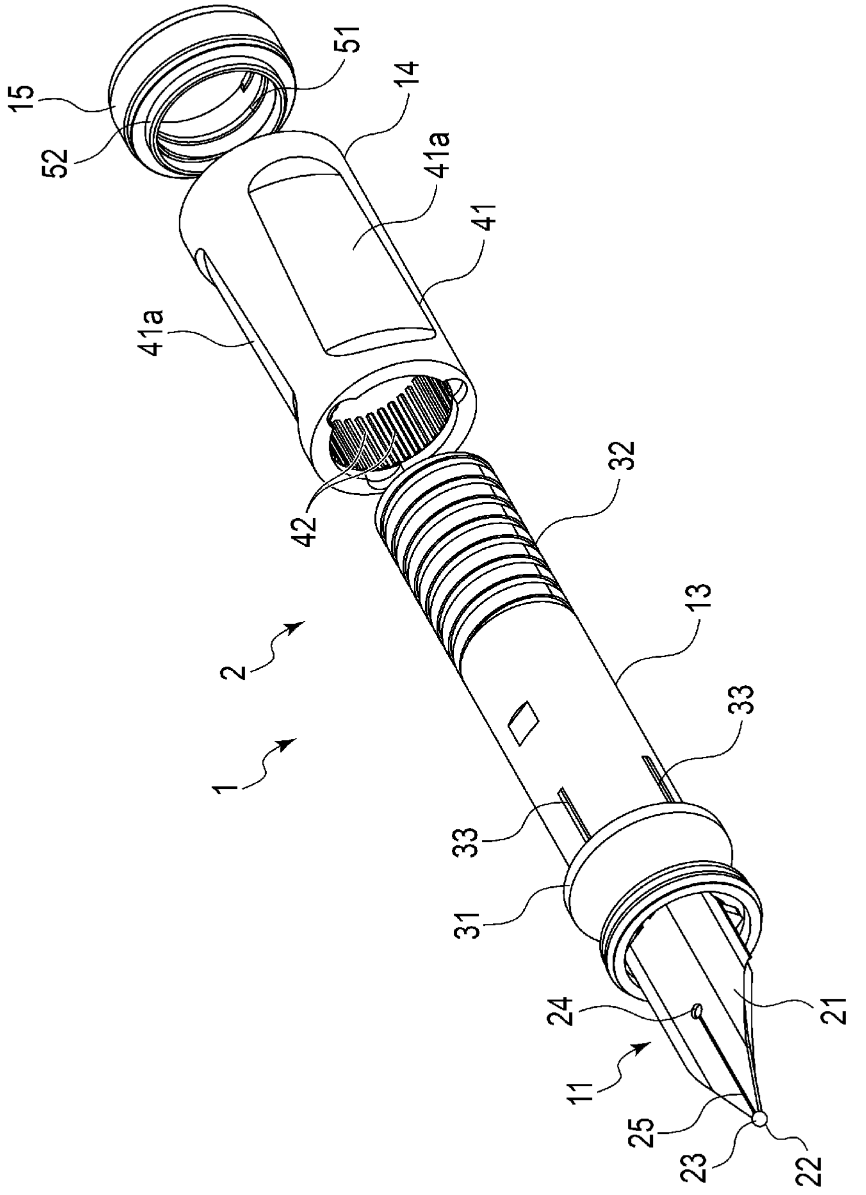
FIG. 4 is a perspective view showing a structure of the pen tip part.
Figure 5:
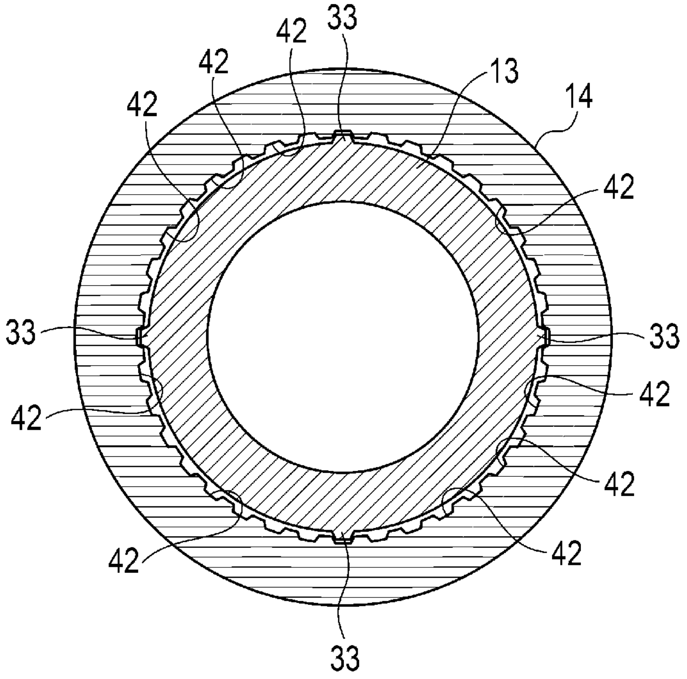
FIG. 5 is a sectional view showing structures of an inner cylinder and an outer cylinder of the pen tip part.
Figure 6:
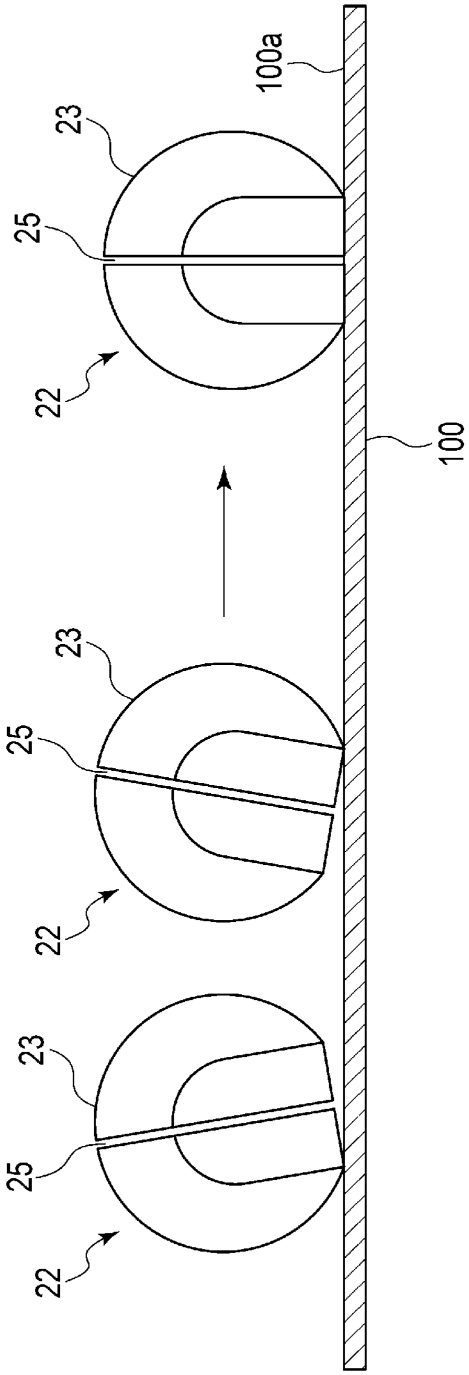
FIG. 6 is an explanatory illustration showing an example of use of the writing instrument.
Figure 7:
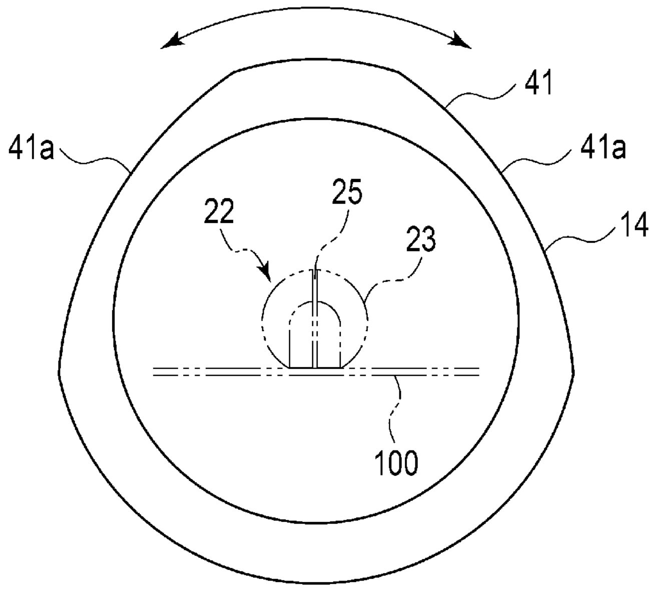
FIG. 7 is an explanatory illustration showing an example of use of the writing instrument.

FIG. 1 is a sectional view showing a structure of the writing instrument 1 according to an embodiment of the present invention. FIG. 2 is a sectional view showing a structure of the pen tip part 2 of the writing instrument 1, and FIG. 3 is a sectional view showing a structure of the pen tip part 2 and also an example of its use. FIG. 4 is a perspective view showing a structure of the pen tip part 2. FIG. 5 is a sectional view showing structures of an inner cylinder 13 and an outer cylinder 14 of the pen tip part 2. FIG. 6 is an explanatory illustration showing an example of the use of the writing instrument 1, and the left part of FIG. 6 shows the states before the positional adjustment of the outer cylinder 14 while the right part shows the state after the positional adjustment of the outer cylinder 14. FIG. 7 is an explanatory illustration showing, as an example of the use of the writing instrument 1, the positional relationship of a guide portion 41 of the outer cylinder 14 with respect to a writing portion 22 of a pen tip 11.

According to the present embodiment, the writing instrument 1 has a directional specification for writing. The directional specification for writing here means that, in applying ink onto the surface of a paper sheet or the like using the writing instrument 1, predetermined writing is enabled if the writing instrument 1 is in a state where its circumferential position is a given position. Also, the predetermined writing here refers to, for example, a writing action that does not entail catching during the writing and does not cause blurring, scratches, or the like in written lines due to the position (direction) of the writing portion of the pen tip.

Examples of the writing instrument 1 having a directional specification for writing include a fountain pen, of which production is finished with polishing of the pen tip, a marker pen or the like, which has a directional tip shape, a brush pen, which changes its optimal writing direction and stiffness depending on the way of bundling hairs. Note that the writing instrument 1 is not limited to such writing instruments, but for the present embodiment, the writing instrument 1 will be described using an example of a fountain pen.

As shown in FIG. 1, the writing instrument 1 includes, for example, the pen tip 11, a pen core 12, the inner cylinder 13, the outer cylinder 14, a fixture 15, a barrel 16, and an ink tank 17. In one example, as shown in FIGS. 2 and 3, the pen tip 11, the pen core 12, the inner cylinder 13, the outer cylinder 14, and the fixture 15 of the writing instrument 1 constitute the pen tip part 2.

The pen tip 11 has a directional specification for writing. As shown in FIGS. 1 to 4, 6, and 7, the pen tip 11 includes a pen body 21 and a writing portion 22 formed at the tip of the pen body 21. The pen body 21 is formed in a shape of a thin plate with a pointed tip. The pen body 21 is formed of, for example, a material that is resistant to ink.

In instances where the writing instrument 1 is a fountain pen as assumed by the present embodiment, the pen body 21 is formed of a metal material resistant to acid, alkali, etc., such as gold alloy or stainless steel. The writing portion 22 is formed at the tip of the pen body 21 and adapted to be capable of applying ink onto a paper surface.

As a concrete example, the pen body 21 is provided with a pen point 23 at the tip, as shown in FIGS. 2, 4, 6, and 7. Also, as shown in FIG. 4, the pen body 21 has a heart hole 24 formed between the tip end side and the center side of the pen body 21, and a slit 25 is formed from the tip end of the pen body 21 including the pen point 23 to the heart hole 24. The pen body 21 may include, for example, an indication of a design, a marker, etc., which include characters, figures, or the like formed of grooves or by engraving, printing, plating, and so on. The writing portion 22 is constituted by the pen point 23 in which the slit 25 is formed.

In the pen tip 11, ink is supplied to the tip of the pen body 21 by capillary action through the slit 25 formed in the pen body 21, so that the pen point 23, i.e., the writing portion 22, can apply the ink supplied through the slit 25 onto the surface of a paper sheet, etc. The pen core 12 supplies ink to the pen tip 11.

In one example, the pen core 12 permits the ink to flow from the ink tank 17 to the pen tip 11 by capillary action. Also, the pen core 12 takes in an amount of air corresponding to the amount of ink that has flown to the pen tip 11, that is, the pen core 12 performs a so-called gas-liquid exchange action to proceed with the flow of ink from the ink tank 17 to the pen tip 11.

As shown in FIGS. 1 to 3, the pen core 12 is fixed to the pen tip 11 on one end side, while its other portion is fixed within the inner cylinder 13. In one example, the other end of the pen core 12 is formed in a diameter smaller than that of the other portion so that it is arranged inside the ink tank 17.

The inner cylinder 13 is a so-called shaft cylinder or neck cylinder. As shown in FIGS. 1 to 3, the inner cylinder 13 retains the pen core 12 to which the pen tip 11 is attached, so that at least the writing portion 22 located at the end of the pen tip 11 and the heart hole are exposed to the outside. In one example, the inner cylinder 13 retains the pen core 12 by allowing the pen core 12 to be fit within it.

As shown in FIGS. 1 to 4, the inner cylinder 13 includes, for example, a seat portion 31, a male screw portion 32, a projection portion 33, and a fixing portion 34.

In one example, the seat portion 31 is formed on the outer peripheral surface of the inner cylinder 13 at one end portion in the axial direction. The seat portion 31 is an annular protrusion formed on the outer peripheral surface of the inner cylinder 13 at one end portion and it protrudes radially outwardly. The seat portion 31 has an end surface which abuts on the end portion of the outer cylinder 14.

The male screw portion 32 is formed on the outer peripheral surface of the inner cylinder 13 at the other end portion in the axial direction.

The projection portion 33 is a projection formed on a part of the outer peripheral surface of the inner cylinder 13 that is between the seat portion 31 and the male screw portion 32. As shown in FIG. 2, the projection portion 33 is formed on a part of the inner cylinder 13 which, in the state where the inner cylinder 13 has been arranged within the outer cylinder 14, faces the outer cylinder 14 in the radial direction. In one example, the projection portion 33 is formed on the outer peripheral surface of the inner cylinder 13 that is adjacent to the seat portion 31. As shown in FIGS. 2 to 4, the projection portion 33 is, for example, a projection extending in the axial direction of the inner cylinder 13.

As shown in FIG. 5, more than one projection portion 33 is provided in the circumferential direction of the inner cylinder 13 at predetermined intervals. Such multiple projection portions 33 may be arranged at regular intervals or irregular intervals in the circumferential direction of the inner cylinder 13. The present embodiment assumes the case where, as shown in FIG. 5, four projection portions 33 are provided at 90° intervals in the circumferential direction of the inner cylinder 13. In one example, the cross section of the projection portion 33 that is orthogonal to the longitudinal direction of the projection portion 33 has a trapezoidal shape with a small-width top.

In one example, the fixing portion 34 is provided inside the inner cylinder 13 and is formed in a cylindrical shape having a diameter smaller than the inner diameter of the inner cylinder 13. As shown in FIG. 1, the fixing portion 34 is formed so that it can fix the ink tank 17. In one example, the end of the fixing portion 34 is inclined with respect to the axial direction. The pen core 12 has its other end arranged inside the fixing portion 34.

The outer cylinder 14 is formed in a cylindrical shape. The outer cylinder 14 has a diameter slightly larger than the outer diameter of the inner cylinder 13 so that the inner cylinder 13 can be inserted. The outer cylinder 14 forms a grip portion of the writing instrument 1. As shown in FIGS. 4 and 7, the outer cylinder 14 has a guide portion 41 on its outer peripheral surface for the user to grip with fingers.

Also, as shown in FIG. 4, the outer cylinder 14 in one example include multiple grooves 42 formed in its inner circumferential surface on one end side where it faces the seat portion 31 of the inner cylinder 13, and these grooves 42 are arranged in the circumferential direction at predetermined intervals. Also in one example, the outer cylinder 14 is formed such that the inner diameter of its other end portion is larger than the inner diameter of the portion from the one end to the other end side.

The guide portion 41 is a portion formed on the outer peripheral surface side of the outer cylinder 14 and constituted by a recess, a projection, or a predetermined shape to be contacted by the fingers of the user. The guide portion 41 serves to guide the fingers of the user for placement. As one example, the present embodiment employs the guide portion 41 constituted by, as shown in FIGS. 4 and 7, two recesses 41*a*, 41*a* arranged at two circumferential positions of the outer circumferential surface of the outer cylinder 14. As shown in FIG. 7, in one example, the two recesses 41*a*, 41*a* are formed in the same shape, and are disposed on the upper side of the outer circumferential surface of the outer cylinder 14 when the writing instrument 1 is in the posture intended for writing, so that the thumb and the index finger can come into contact.

As shown in FIGS. 2 to 4, the grooves 42 are recessed portions extending in the axial direction. For example, the grooves 42 are provided in the circumferential direction of the outer cylinder 14 at predetermined intervals. The grooves 42 may be formed by cutting out portions of the inner peripheral surface of the outer cylinder 14, or multiple axially extending projections may be formed on the inner peripheral surface of the outer cylinder 14 so that the grooves 42 are provided between the multiple projections. Each groove 42 is adapted so that the projection portion 33 can be arranged in it and engaged with it in the circumferential direction. The grooves 42 are formed in the portion of the inner peripheral surface of the outer cylinder 14 which radially faces the projection portion 33 formed at the inner cylinder 13 in the state where the inner cylinder 13 has been arranged within the outer cylinder 14. The grooves 42 are formed in the inner peripheral surface of the outer cylinder 14 on the end side where the outer cylinder 14 abuts the inner cylinder 13.

The multiple grooves 42 serve to restrict relative circumferential movement of the inner cylinder 13 and the outer cylinder 14 through the insertion arrangement of the multiple projection portions 33 and the circumferential engagement with the arranged projection portions 33.

As shown in FIG. 5, the number of the multiple grooves 42 is set to be larger than the number of the projection portions 33 formed at the inner cylinder 13. In one example, the multiple grooves 42 are arranged at regular intervals in the circumferential direction of the outer cylinder 14. Note that the multiple grooves 42 may be arranged at irregular intervals in the circumferential direction of the outer cylinder 14 as long as the arrangement of the multiple projection portions 33 is possible. The present embodiment assumes the case where, as one example, thirty-six grooves 42 are provided at 10° intervals in the circumferential direction of the inner cylinder 13, as shown in FIG. 5. Also in one example, the opening of each groove 42 has a profile of, in the cross section orthogonal to the longitudinal direction of the grooves 42, a trapezoidal shape with a small-width bottom.

The fixture 15 fixes the outer cylinder 14 arranged on the outer peripheral surface side of the inner cylinder 13, to the inner cylinder 13. As a concrete example, the fixture 15 is formed in a cylindrical shape of which one end portion in the axial direction abuts on the other end portion of the outer cylinder 14. The length of the fixture 15 is smaller than the length of the male screw portion 32 of the inner cylinder 13 in the axial direction.

As shown in FIGS. 2 to 4, the fixture 15 has a female screw portion 51 formed in its inner peripheral surface. In other words, the fixture 15 is a so-called screw ring. As shown in FIGS. 2 to 4, the fixture 15 in one example includes a convex portion 52 formed on the radially central side of the end portion that abuts on the outer cylinder 14.

The female screw portion 51 is formed in the inner peripheral surface of the fixture 15 and is engaged with the male screw portion 32 of the inner cylinder 13.

The convex portion 52 is an axially extending annular projection formed coaxially with the fixture 15. The convex portion 52 has an outer diameter equal to or slightly larger than the inner diameter of the other end portion of the outer cylinder 14. The outer peripheral surface of the convex portion 52 abuts on the inner peripheral surface of the other end portion of the outer cylinder 14 so as to support the other end portion of the outer cylinder 14 in the radial direction.

The barrel 16 is fixed to the inner cylinder 13. The barrel 16 is formed in a bottomed cylindrical shape, and is capable of arranging the ink tank 17 within it. The barrel 16 has a female screw portion 61 formed in its inner peripheral surface at one end where the barrel 16 opens. The female screw portion 61 is engaged with the male screw portion 32 of the inner cylinder 13.

The ink tank 17 stores ink. In one example, the ink tank 17 is a consumable ink cartridge or a converter constituted by an ink-refillable aspirator. The ink tank 17 is fixed to the fixing portion 34 of the inner cylinder 13 and feeds the pen core 12 arranged at the fixing portion 34 with ink.

In the writing instrument 1 (the pen tip part 2) configured as above, the axial-direction lengths of the multiple projection portions 33 and the multiple grooves 42 are, for example, set to such lengths that in the state where the fixture 15 has been moved to the rear end side of the male screw portion 32 of the inner cylinder 13, which is opposite to the pen tip 11 side, the projection portions 33 and the grooves 42 are separated from each other and the circumferential rotation of the outer cylinder 14 with respect to the inner cylinder 13 is permitted, as can be seen from FIG. 5. In other words, the multiple projection portions 33 and the multiple grooves 42 each have a length in the axial direction which is set to be shorter than the length obtained by subtracting the sum of the length of the outer cylinder 14 and the length of the fixture 15 excluding the convex portion 52, from the length of the inner cylinder 13 spanning from the seat portion 31 to the rear end. In yet other words, the axial-direction lengths of the multiple projection portions 33 and the multiple grooves 42 are each smaller than the axial-direction length allowed for the fixture 15 to be engaged with the male screw portion 32, that is, the distance for which the fixture 15 is permitted to move while being in the state of engagement with the male screw portion 32.

According to the writing instrument 1 (the pen tip part 2) configured as above, the inner cylinder 13 and the outer cylinder 14 are restricted from the relative circumferential movement during the engagement between the multiple projection portions 33 and the multiple grooves 42 as seen from FIGS. 2 and 5. Also, the relative axial movement of the inner cylinder 13 and the outer cylinder 14 is restricted by the engagement of the fixture 15 with the male screw portion 32 of the inner cylinder 13 and by the abutment of the outer cylinder 14 on the seat portion 31 of the inner cylinder 13 and on the end surface of the fixture 15, as shown in FIG. 2. Further, as shown in FIG. 2, the one end side of the outer cylinder 14 is supported in the radial direction by the inner cylinder 13 through the multiple grooves 42 radially abutting on the multiple projection portions 33 of the inner cylinder 13, and the other end side of the outer cylinder 14 is supported in the radial direction by the fixture 15 engaged with the inner cylinder 13 through the inner circumferential surface of the outer cylinder 14 radially abutting on the outer circumferential surface of the convex portion 52 of the fixture 15. Accordingly, the outer cylinder 14 is supported in the radial direction at both of its ends with respect to the inner cylinder 13, and as such, its radial movement with respect to the inner cylinder 13 is restricted. For these configurations, the outer cylinder 14 is fixed to the inner cylinder 13.

Therefore, the writing instrument 1 (the pen tip part 2), even with a configuration wherein the outer cylinder 14 is axially and circumferentially movable with respect to the inner cylinder 13, can prevent the outer cylinder 14 from moving during use. Also, at the time of the user holding the writing instrument 1 with fingers in order to perform writing, the fingers are guided by the guide portion 41 so that the user can use the writing instrument 1 in a constant holding manner.

While the pen tip 11 in the writing instrument 1 (the pen tip part 2) has a directional specification for writing, the outer cylinder 14 is adapted to be rotatable with respect to the inner cylinder 13, and therefore, the writing instrument 1 (the pen tip part 2) can adjust the circumferential position of the guide portion 41, which is for contact by the fingers of the user, with respect to the writing portion 22 of the pen tip 11. Accordingly, in the event that the contact surface of the writing portion 22 of the pen tip 11 for contact with a paper surface 100*a* is inclined with respect to the plane direction of the paper surface 100*a* at the time of writing on a paper sheet 100 as shown in the left part of FIG. 6, that is, if writing may not be performed as desired, the contact surface of the writing portion 22 with the paper surface 100*a* can be adjusted to a preferred position with respect to the paper surface 100*a* as shown in the right part of FIG. 6, even in the state where the user holds the writing instrument 1 in the same holding manner.

An adjustment method of the writing instrument 1 will be described in more detail. First, the inner cylinder 13 and the outer cylinder 14 are restricted from relative circumferential movement by the engagement between the multiple projection portions 33 and the multiple grooves 42 as shown in FIG. 2. Here, as shown in FIG. 3, the outer cylinder 14 can be made rotatable in the circumferential direction with respect to the inner cylinder 13 by displacing the inner cylinder 13 and the outer cylinder 14 in the axial direction until the multiple projection portions 33 and the multiple grooves 42 are disengaged from each other.

The outer cylinder 14 is rotated in the circumferential direction with respect to the inner cylinder 13 as indicated in FIG. 7 with arrows so that the fingers of the user and the guide portion 41 are placed in a preferred positional relationship with respect to the writing portion 22 of the pen tip 11, and the outer cylinder 14 is then fixed by the fixture 15. In this manner, the writing instrument 1 can adjust the position of the guide portion 41 of the outer cylinder 14 with respect to the writing portion 22 of the pen tip 11. As such, the writing instrument 1 can adjust the relative position between the writing portion 22 of the pen tip 11 and the guide portion 41 of the outer cylinder 14, i.e., the grip portion, to be a position suitable for the manner of holding of the writing instrument 1 by the user. Therefore, the writing instrument 1 can secure a desirable contact between the writing portion 22 and the paper surface 100*a* in writing actions and provide a good fit of the writing portion 22 onto the paper surface 100*a* no matter the holding manners of individual users, and the occurrence of catching during writing and blurring, scratches, or the like in written lines can be prevented.

It is additionally noted that the circumferential position of the outer cylinder 14 with respect to the writing portion 22 of the pen tip 11 can be adjusted to as many positions as the number of the grooves 42. For example, in the present embodiment which assumes the use of thirty-six grooves 42, the outer cylinder 14 can be fixed at any of thirty-six positions in the circumferential direction. That is, according to the present embodiment, the outer cylinder 14 can be rotated with respect to the writing portion 22 of the pen tip 11 at 10° intervals. Also, for this adjustment of the outer cylinder 14, the fixture 15 is not required to be completely detached from the male screw portion 32 of the inner cylinder 13, but it is sufficient for the fixture 15 to be only rotated in such a way that the fixture 15 is rotated to a position that causes axial disengagement between the multiple projection portions 33 and the multiple grooves 42 so as to move the outer cylinder 14 in the axial direction with respect to the inner cylinder 13, and after the outer cylinder 14 is rotated, the fixture 15 is rotated in the fastening direction. Once the engagement between the projection portions 33 and the grooves 42 is released, the rotation of the outer cylinder 14 is not restricted, and therefore, the outer cylinder 14 can be rotated without requiring application of a large force. For these reasons, the writing instrument 1 (the pen tip part 2) allows easy adjustment of the outer cylinder 14. Further, since the configuration of fixing the pen tip 11, the pen core 12, and the ink tank 17 to the inner cylinder 13 is adopted, the adjustment of the outer cylinder 14 requires the user to only pinch the inner cylinder 13, rotate the fixture 15, and then slide and rotate the outer cylinder 14. Therefore, in the adjustment of the outer cylinder 14, it is possible to prevent the ink from adhering to the fingers of the user.

Also, the writing instrument 1 and the pen tip part 2 are adapted so that the outer cylinder 14, the fixture 15, the barrel 16, and the ink tank 17 can be attached to and detached from the inner cylinder 13, and accordingly, only necessary parts can be subjected to, for example, cleaning in the process of maintenance, ink color replacement, and the like. Therefore, the writing instrument 1 and the pen tip part 2 can prevent a liquid entry into and a liquid remainder between the components due to the cleaning.

The writing instrument 1 and the pen tip part 2 configured as above allow for the adjustment of the circumferential position of the outer cylinder 14, i.e., the grip portion, with respect to the writing portion 22.

Note that the present invention is not limited to the foregoing embodiments. For example, while the above examples have assumed a configuration wherein the guide portion 41 is provided with two recesses 41*a*, 41*a* having the same shape at two circumferential positions of the outer circumferential surface of the outer cylinder 14, this is not a limitation. As an example, the two recesses 41*a*, 41*a* may be set such that one recess 41*a* is for the thumb and the other recess 41*a* is for the index finger, so that the thumb and the index finger can be contacted. The outer cylinder 14 with the guide portion 41 having one recess 41*a* set for the thumb and the other recess 41*a* set for the index finger is either for a right-handed user or for a left-handed user. Also, in adopting the outer cylinder 14 with the guide portion 41 having one recess 41*a* set for the thumb and the other recess 41*a* set for the index finger, it is possible to configure this single outer cylinder 14 to be switchable between the mode for a right-handed user and the mode for a left-handed user upon turning over of the orientations of the end portions in the axial direction, by forming the inner diameters of the respective end portions to be larger than the other portions and providing multiple grooves 42 in the respective ends.

In connection with the above examples, exemplary numbers of the multiple projection portions 33 and the multiple grooves 42 have been given, but the numbers of the multiple projection portions 33 and the multiple grooves 42 are discretionarily settable. For example, an increased number of the multiple grooves 42 can provide a smaller angle unit for the adjustment of the circumferential position of the outer cylinder 14 with respect to the writing portion 22 of the pen tip 11, and accordingly, more detailed adjustment is enabled.

Also, the above examples have assumed a configuration in which the multiple projection portions 33 are formed on the outer peripheral surface of the inner cylinder 13 and the multiple grooves 42 are formed in the inner peripheral surface of the outer cylinder 14, but this is not a limitation. As an example, a configuration in which the multiple projection portions 33 are formed on the end surface of the seat portion 31 of the inner cylinder 13 and the multiple grooves 42 are formed in the end surface of the outer cylinder 14 that faces the seat portion 31 may be adopted.

Figure 8:
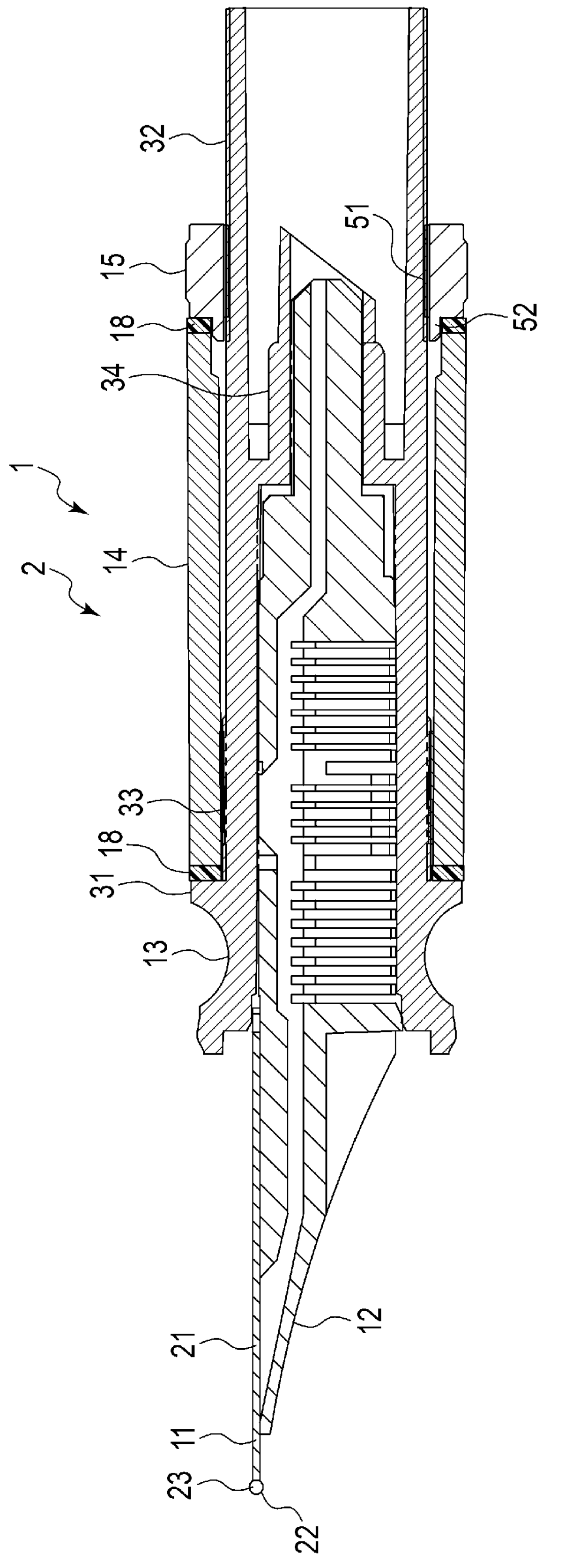
FIG. 8 is a sectional view showing a structure of a pen tip part of a writing instrument according to another embodiment of the present invention.

As another embodiment, for example, the writing instrument 1 and the pen tip part 2 may have a configuration as shown in FIG. 8 in which, in addition to the configuration described with reference to the above embodiments, a packing 18 for preventing loosening is provided between the seat portion 31 of the inner cylinder 13 and one end portion of the outer cylinder 14, and between the other end portion of the outer cylinder 14 and the end portion of the fixture 15.

Figure 9:
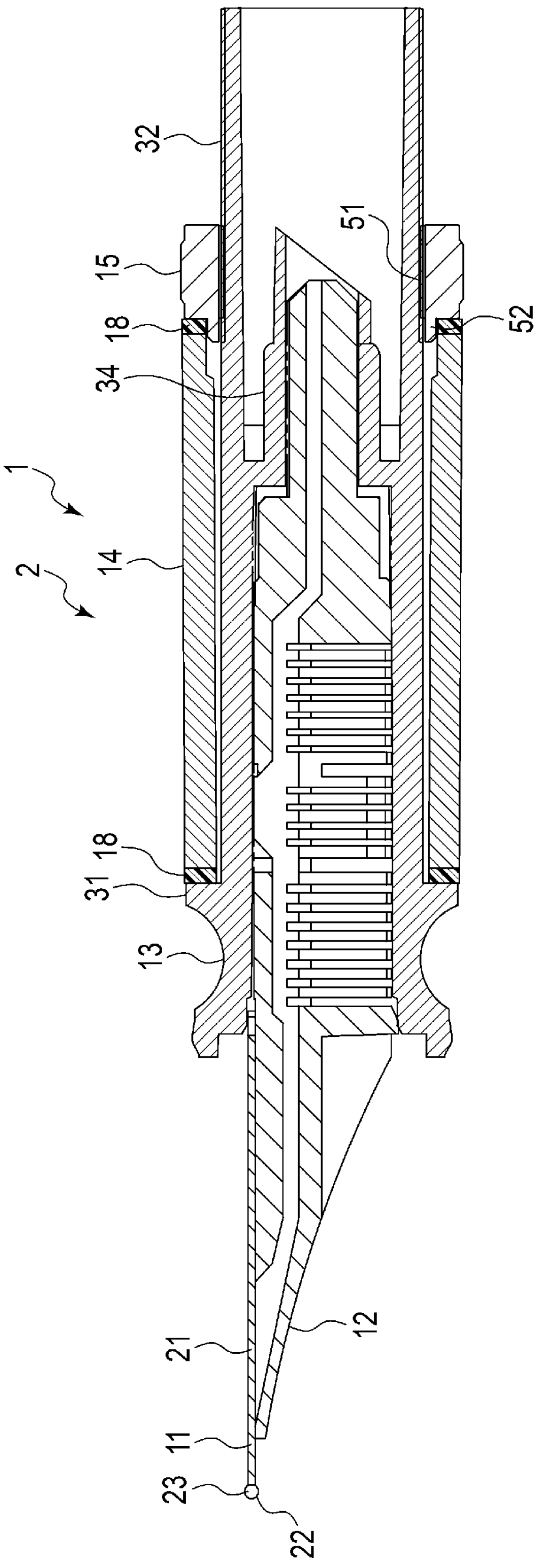
FIG. 9 is a sectional view showing a structure of a pen tip part of a writing instrument according to another embodiment of the present invention.

With the configuration in which such packings 18 are provided, the circumferential movement of the outer cylinder 14 can be restricted by the friction of each packing 18, and therefore, it is possible to, for example, omit the multiple projection portions 33 from the inner cylinder 13 and the multiple grooves 42 from the outer cylinder 14 as in the configuration shown in FIG. 9. According to such a writing instrument 1 (pen tip part 2), the outer cylinder 14 is rotated in the circumferential direction of the inner cylinder 13 to adjust the position with respect to the writing portion 22 of the pen tip 11, and then the fixture 15 is fastened, so that the axial and circumferential movements of the outer cylinder 14 can be restricted. Therefore, the writing instrument 1 (the pen tip part 2) here is capable of adjusting the circumferential position of the outer cylinder 14 with respect to the inner cylinder 13 in a non-stepwise manner, and even more precise positional adjustment of the outer cylinder 14 is enabled.

The above examples have assumed a configuration in which the writing instrument 1 has the fixture 15 and the barrel 16, and these fixture 15 and barrel 16 are screw-engaged with the male screw portion 32 of the inner cylinder 13. However, this is not a limitation. A configuration in which the opening end portion of the barrel 16 functions as a fixture may also be adopted. That is, the fixture 15 may be omitted and the barrel 16 may be used as a fixture. Such a barrel 16 serving as a fixture may be configured, for example, such that the convex portion 52 is provided at its opening end portion so as to have the end portion abut onto the end portion of the outer cylinder 14 in the axial direction and to support the outer cylinder 14 in the radial direction.

While the above examples have assumed a configuration in which the convex portion 52 for supporting the outer cylinder 14 in the radial direction is provided on the fixture 15 or the barrel 16, this is not a limitation. It is also possible to adopt a configuration in which the radial-direction clearance between the inner cylinder 13 and the outer cylinder 14 is reduced, or in which a supporting protrusion or protrusions are formed on the inner peripheral surface of the outer cylinder 14, so as to support the outer cylinder 14 by the inner cylinder 13 in the radial direction.

As also described above, in the writing instrument 1 (the pen tip part 2), the writing portion 22 of the pen tip 11 has a directional specification for writing, and it would serve the purpose if the position of the grip portion, i.e., the guide portion 41 of the outer cylinder 14 for guiding positions of the fingers, is adjustable with respect to the writing portion 22 of the pen tip 11. As such, the writing instrument 1 (the pen tip part 2) is not limited to a fountain pen, but is applicable to various writing instruments.

Even in instances where the writing portion 22 of the pen tip 11 does not have a directional specification for writing, the foregoing configurations for enabling the circumferential positional adjustment of the outer cylinder 14 with respect to the inner cylinder 13 can still be employed. Such a writing instrument is effective in, for example, instances where the inner cylinder 13 and the outer cylinder 14 are provided with a continuous design and position alignment for such a design is to be performed. For example, such a design may be a design with a decorative effect. As another example of such a design, it is possible to adopt indications, etc. of information representing ink colors in which an arrow, a dot, or the like is provided on the outer surface of the seat portion 31 of the inner cylinder 13 and indications of ink colors are put on the outer cylinder 14, so that the positions of the inner cylinder 13 and the outer cylinder 14 are aligned based on the position of the intended ink.

The present invention is not limited to the foregoing embodiments. For practical implementation, various modifications may be adopted without departing from the gist of the invention. Various embodiments may be discretionarily combined for implementation, and such combinations will produce combined effects. Moreover, the embodiments involve various aspects, and appropriate combinations of the disclosed features will permit various inventions to be derived. For example, if omission of several features from the entire configuration or structure disclosed for the embodiments can realize the intended object and provide the effects, the configuration or structure after such omission may be derived as an invention.

REFERENCE SIGNS LIST

1 . . . Writing instrument
2 . . . Pen tip part
11 . . . Pen tip
12 . . . Pen core
13 . . . Inner cylinder
14 . . . Outer cylinder
15 . . . Fixture
16 . . . Barrel
17 . . . Ink tank
18 . . . Packing
21 . . . Pen body
22 . . . Writing portion
23 . . . Pen point
24 . . . Heart hole
25 . . . Slit
31 . . . Seat portion
32 . . . Male screw portion
33 . . . Projection portion
34 . . . Fixing portion
41 . . . Guide portion
42 . . . Groove
51 . . . Female screw portion
52 . . . Convex portion
61 . . . Female screw portion
100 . . . Paper sheet
**100*a*** . . . Paper surface

What is claimed is:

1. A writing instrument comprising:

a pen tip which includes a writing portion and has a directional specification for writing of the writing portion;

a cylindrical inner cylinder which fixes the pen tip;

a cylindrical outer cylinder into which the inner cylinder can be inserted and which includes a finger guide portion on an outer peripheral surface;

a fixture which fixes the outer cylinder to the inner cylinder; and a barrel which is fixed to the inner cylinder, wherein the inner cylinder includes a seat portion on one end side and a male screw portion on another end side, the seat portion abutting on one end portion of the outer cylinder in an axial direction, the fixture is cylindrical and includes a female screw portion in an inner circumferential surface, the fixture abutting on another end portion of the outer cylinder, the female screw portion being engaged with the male screw portion, the inner cylinder includes a plurality of projection portions on a part of an outer circumferential surface that is between the seat portion and the male screw portion and that faces the outer cylinder, the plurality of projection portions being arranged in a circumferential direction, and the outer cylinder includes a plurality of grooves in a part of an inner circumferential surface that faces the plurality of projection portions, the plurality of grooves being arranged in the circumferential direction and adapted so that the plurality of projection portions are arranged in the plurality of grooves.

2. The writing instrument according to claim 1, wherein the plurality of projection portions and the plurality of grooves extend along the axial direction.

3. The writing instrument according to claim 2, wherein the plurality of projection portions are less than the plurality of grooves in number, and the plurality of grooves are arranged at equal intervals in the circumferential direction.

4. A pen tip part comprising:

a pen tip which includes a writing portion and has a directional specification for writing of the writing portion;

an inner cylinder which fixes the pen tip;

an outer cylinder which is provided on an outer peripheral side of the inner cylinder, the outer cylinder being movable in a circumferential direction with respect to the inner cylinder; and a fixture which fixes the outer cylinder to the inner cylinder, wherein the inner cylinder includes a seat portion on one end side and a male screw portion on another end side, the seat portion abutting on one end portion of the outer cylinder in an axial direction, the fixture is cylindrical and includes a female screw portion in an inner circumferential surface, the fixture abutting on another end portion of the outer cylinder, the female screw portion being engaged with the male screw portion, the inner cylinder includes a plurality of projection portions on a part of an outer circumferential surface that is between the seat portion and the male screw portion and that faces the outer cylinder, the plurality of projection portions being arranged in a circumferential direction, and the outer cylinder includes a plurality of grooves in a part of an inner circumferential surface that faces the plurality of projection portions, the plurality of grooves being arranged in the circumferential direction and adapted so that the plurality of projection portions are arranged in the plurality of grooves.

* * * * *